(12) United States Patent
Donoho

(10) Patent No.: US 7,036,278 B1
(45) Date of Patent: May 2, 2006

(54) BIRD DEFLECTOR DEVICES AND METHODS

(75) Inventor: Bruce Donoho, Mission Viejo, CA (US)

(73) Assignee: Bird-B-Gone, Inc., Mission Viejo, CA (US)

( * ) Notice: Subject to any disclaimer, the term of this patent is extended or adjusted under 35 U.S.C. 154(b) by 20 days.

(21) Appl. No.: 10/984,564

(22) Filed: Nov. 8, 2004

(51) Int. Cl.
*A01M 29/00* (2006.01)
*A01M 1/24* (2006.01)

(52) U.S. Cl. .............................. 52/101; 43/1

(58) Field of Classification Search .................. 52/101, 52/97; 43/1; 256/11
See application file for complete search history.

(56) References Cited

U.S. PATENT DOCUMENTS

| | | | | |
|---|---|---|---|---|
| 258,701 A * | 5/1882 | Bower | ...... | 47/32.4 |
| 2,051,302 A * | 8/1936 | Lefforge | ...... | 256/11 |
| 2,258,803 A * | 10/1941 | Peles | ...... | 52/101 |
| 2,304,593 A * | 12/1942 | Peles | ...... | 52/101 |
| 2,456,731 A * | 12/1948 | Peles | ...... | 52/101 |
| 2,475,047 A * | 7/1949 | Peles | ...... | 52/101 |
| 2,888,716 A * | 6/1959 | Kaufmann | ...... | 52/101 |
| 3,191,239 A * | 6/1965 | Moore et al. | ...... | 52/101 |
| 3,292,319 A | 12/1966 | McCarthy | | |
| 3,407,550 A * | 10/1968 | Shaw | ...... | 52/101 |
| 4,074,653 A | 2/1978 | Pember | | |
| 4,997,721 A * | 3/1991 | Shaw et al. | ...... | 428/577 |
| 5,062,612 A * | 11/1991 | Mincher | ...... | 256/11 |
| 5,181,338 A * | 1/1993 | Chatten | ...... | 43/58 |
| 5,343,651 A | 9/1994 | Chatten | | |
| 5,452,536 A | 9/1995 | Chatten | | |
| 5,691,032 A * | 11/1997 | Trueblood et al. | ...... | 428/136 |
| 6,116,563 A * | 9/2000 | Tsai | ...... | 248/512 |
| 6,264,173 B1 * | 7/2001 | Badger et al. | ...... | 256/10 |
| 6,306,471 B1 * | 10/2001 | Pitman et al. | ...... | 428/18 |
| 6,457,283 B1 * | 10/2002 | Jensen | ...... | 52/101 |
| 6,534,719 B1 * | 3/2003 | Wright | ...... | 174/139 |
| 6,543,175 B1 * | 4/2003 | Tucker | ...... | 42/94 |
| 6,640,506 B1 | 11/2003 | Landers | | |
| 6,823,631 B1 * | 11/2004 | Homer et al. | ...... | 52/101 |
| 6,836,992 B1 * | 1/2005 | Rains | ...... | 43/1 |
| 2004/0181991 A1 * | 9/2004 | Rains | ...... | 43/1 |

* cited by examiner

*Primary Examiner*—Robert Canfield
(74) *Attorney, Agent, or Firm*—Rutan & Tucker, LLP

(57) ABSTRACT

A bird deterring device has a base and a stem, wherein a plurality of spikes are coupled to the stem and/or base, and wherein the distal ends of the spikes have an anti-condensation drip element to avoid or reduce drip marks produced by previously known devices.

12 Claims, 1 Drawing Sheet

BIRD DEFLECTOR DEVICES AND METHODS

FIELD OF THE INVENTION

The field of the invention is protective devices for structures, and especially bird deterring devices.

BACKGROUND OF THE INVENTION

There are numerous devices and methods known in the art to deter birds from nesting or perching on various structures. Depending on the particular bird to be deterred, and especially depending on the site of installation, the configuration of such devices may vary considerably. For example, where birds need to be deterred on a relatively confined space (e.g., rim or ledge of a building), a rack of spikes may be installed.

However, such spike racks are often impractical and unsightly, especially where the area to be protected is relatively large. To protect larger areas, or to deter relatively big bids (e.g., crows, sea gulls, etc.), known bird deterrents have a center post and radially extending arms that rotate in the wind. Typically, such deterrents include a protective or functional terminal portion on the distal end of the arm to better engage with the wind, act as an additional visual deterrent, and/or to provide physical protection against unintended contact. Examples for such devices are described in U.S. Pat. No. 6,640,506 to Landers, U.S. Pat. Nos. 5,343,651 and 5,452,536 to Chatten, U.S. Pat. No. 4,074,653 to Pember, and U.S. Pat. No. 3,292,319 to McCarthy.

While the above devices prevent various birds from perching or nesting on the protected structure, various disadvantages nevertheless remain. Most notably, the protective or functional terminal portion typically increases the surface area to a significant amount, which provides for a large area of condensation and condensate run-off, especially in marine and coastal areas. Such run-off is further often laden with particulate matter and smog, leaving the areas below the bird deterrent often spotted with drip marks and other discolorations. Moreover, in all or almost all of the known bird deterrents, the protective or functional terminal portion tends to increase visibility of the device, which is not always desirable.

Therefore, while numerous methods and devices for deterring birds are known in the art, all or almost all of them suffer from one or more disadvantages. Thus, there is still a need to provide improved bird deterrent devices.

SUMMARY OF THE INVENTION

The present invention is directed to a bird deterring device in which a base is coupled to a stem, and in which a plurality of radially arranged and outwardly extending spikes is coupled to the base and/or stem. In preferred devices, at least a portion of one or more radially arranged spikes has an upward orientation relative to the at least one of the base and stem, and further has a distal end with an anti-condensation drip element.

In especially preferred devices, the base and the stem are in a non-rotatable relationship relative to each other (e.g., are contiguous), and the spikes are in a fixed relationship relative to a structure (e.g., building, flag post, etc.) to which the base in coupled. Preferred spikes have an arced configuration, and are manufactured from a metal, metal alloy, and/or synthetic polymer.

The anti-condensation drip element is preferably manufactured from the same material as the radially arranged spikes, and is most preferably formed from or otherwise integral with the spike. While not limiting to the inventive subject matter, particularly preferred anti-condensation drip elements are formed in a spiral shape, zigzag shape, wave shape, or an irregular shape. The number of spikes may vary considerably, however, it is typically preferred that the device has at least four, more typically at least six, and most typically at least eight spikes. The spikes may be arranged in a variety of manners, however, radial coupling to the stem is preferred such that the upper end of the stem and the spikes allow a relatively small bird (e.g., sparrow) to perch while at the same time deterring a relatively big bird (e.g., sea gull).

Various objects, features, aspects and advantages of the present invention will become more apparent from the following detailed description of preferred embodiments, along with the accompanying drawing.

DETAILED DESCRIPTION

The inventor surprisingly discovered that a bird deterring device can be manufactured that provides effective deterrent effect while at the same time reducing or eliminating condensation run-off and staining of a structure or area associated with the structure to which the device is coupled.

Figure 1:
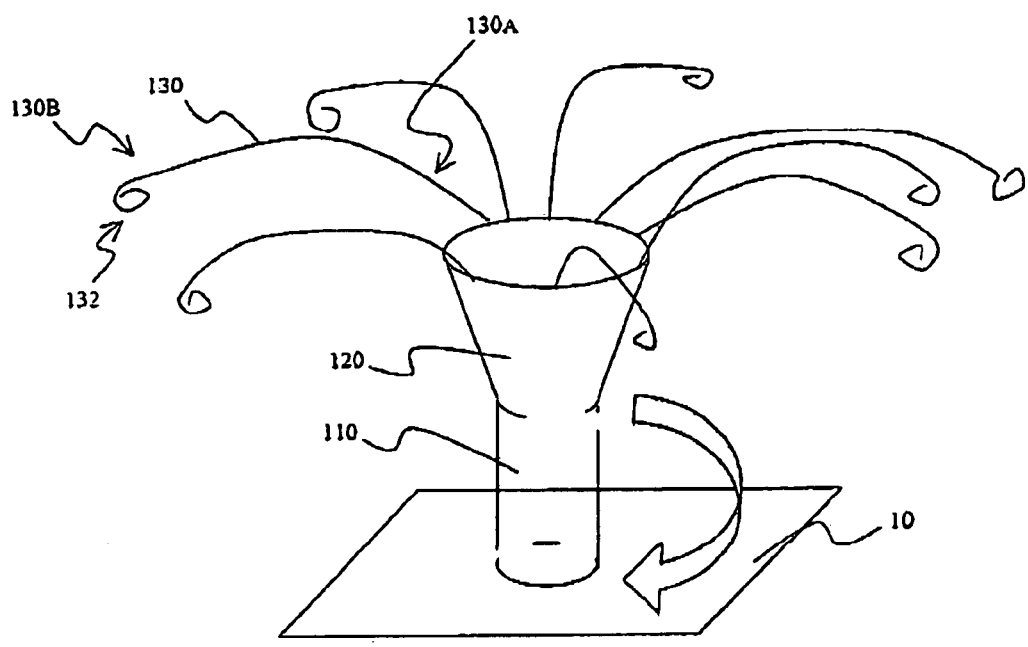
FIG. 1 is an exemplary device according to the inventive subject matter.

In one especially preferred aspect, the bird deterring device has a base that is coupled to a stem. In contemplated devices, a plurality of radially arranged and outwardly extending spikes is coupled to the base and/or stem, wherein at least a portion of at least one radially arranged spike has an upward orientation relative to the base and/or stem. Furthermore, at least one spike in contemplated devices has a distal end that includes an anti-condensation drip element. FIG. 1 shows one exemplary device 100 on a surface 10, wherein the device has a base 110 that is coupled to stem 120. Coupled to the stem is a plurality of spikes 130 having an upwards oriented portion 130A and a distal portion 130B, wherein part of the distal portion is configured as a spiral to form anti-condensation drip element 132.

With respect to the stem and base it is contemplated that both the stem and base can be manufactured from various materials and combinations thereof. For example, suitable materials include natural and synthetic polymers, wood, stone, metals and metal alloys, and all reasonable combinations thereof. However, synthetic polymers are typically preferred. Furthermore, with respect to the size of contemplated bases, it is typically preferred that the base is configured to receive and at least temporarily retain the stem in a stable position. Therefore, suitable bases may include fastener elements (e.g., hook-and-loop fasteners), weights (e.g., lead plate, sand bag, etc.), or one or more openings that receive a pin, crew, or other fastening element. Among other configurations, it is preferred that the base has a generally circular shape and has an opening to receive the stem (which may be temporarily or permanently coupled to the base). For example, a typical base is between about 0.5 inch to about 10 inches, and more typically between about 2 inches and 4 inches in diameter and has a generally flat (e.g., between about 0.1 inch and 1.0 inch thickness) and round configuration. Alternatively, in other preferred aspects, the base is contiguous with the stem, wherein the base and the stem are most preferably manufactured from the same material. In still further less preferred aspects, it is contemplated that the deterrent device has no base at all, and that the stem is directly coupled to the object and/or area that is to be protected.

With respect to the stem, it is generally preferred that the stem has a cylindrical portion that is coupled to the base, has a diameter of between about 0.3 inches to about 3.0 inches, and that has a length between about 1 inches and 10 inches (most preferably between about 2.5 inches to about 6 inches). However, it should be recognized that alternative shapes are also deemed suitable, and appropriate shapes include bars, square rods, etc. Furthermore, it is contemplated that the stem may also include two or more posts that accommodate two or more head portions to which a plurality of spikes can be coupled.

In preferred aspects, the base and the stem are in a non-rotatable relationship relative to each other, and it is especially preferred that the base and the stem are contiguous (e.g., manufactured in a single piece). Alternatively, however, it should also be recognized that the base and stem and/or spikes are in a rotatable relationship relative to each other (see arrow in FIG. 1). Where the base, stem, and/or spikes are in a rotatable or otherwise movable relationship to each other, it is typically preferred that the movement is effected by wind or an actuator, wherein most preferred actuators are solar powered electric motors.

Particularly preferred deterring devices include at least one, more preferably at least two, even more preferably at least four-eight, and most preferably at least twelve spikes, which are radially arranged and outwardly extending. Of course, it should be recognized that the spikes may be angled to varying degree (e.g., relative to an axis perpendicular to a tangent of the stem), and the angle of one spike may be different from the angle of another spike. Furthermore, it is generally preferred that at least one and more preferably each of the spikes has an upwardly curved portion, wherein the upward slope is most preferably between the point at which the spike is coupled to the stem and a point distal from that point. For example, it is contemplated that at least one of the radially arranged spikes has an arced configuration. Alternatively, the spikes may have a zigzag shape, an irregular shape or a wave-shape.

Contemplated spikes may further coupled to at least one other spike to allow transfer of motion of one spike to the next. Alternatively, each spike may be independently movable relative to the stem and/or base. However, it is typically preferred that the spikes are in a fixed relationship relative to a structure to which the base in coupled (i.e., the entire spike does not exhibit translational or rotational movement). Similar to the stem and base, it should be appreciated that the spikes can be manufactured from a various materials and combinations thereof, and particularly preferred materials include metal, metal alloys, and natural and synthetic polymers. However, it is particularly preferred that the spike is manufactured from a weatherproof metal.

Depending on the size of the bird (or other animal) to be deterred, it is contemplated that the length of the spikes may vary considerably. However, typical spike lengths will be in the range of about 1 inch to 25 inches (and even longer). Furthermore, while not limiting to the inventive subject matter, it is generally preferred that the length of the spikes is identical or with in a range of +/−20% absolute, and more typically +/−10% absolute. The spikes may be coupled to the stem and/or base in numerous manners, including permanently and removably. For example, the spikes may be integral plastic elements that are formed together with the stem and/or base. On the other hand, the spikes may be coupled to the an upper portion of the stem and removably attached via a hook, press-fit, a lid with corresponding channels or openings, etc. Where the spikes are coupled to the stem via a lid, it is contemplated that the lid (or otherwise upper portion of the stem) together with the spikes may be sized such that a relatively small animal (e.g., sparrow-sized bird) is not deterred while a larger sized animal (e.g., crow-sized bird) is deterred. Still further, it is contemplated that the lid, stem, and/or base may have an additional element or structure (e.g., channel, drain, reservoir, etc.) that receives and optionally retains condensate that runs off the spike towards the stem.

Particularly preferred anti-condensation drip elements are fabricated from the same material as the spike or spikes, and in most preferred aspects, the anti-condensation drip element is formed from the radially arranged spike or spikes. The term "anti-condensation drip element" as used herein refers to an element that has (1) an average weight per overall length that is at least 10% (more typically at least 20%, and most typically at least 40%) greater than the average weight of the of the spike at the same overall length, and that has (2) an average surface area per linear length that varies no more than 20% absolute (more typically no more than 10% absolute, and most typically no more than 50% absolute) as compared to the average surface area of the spike at the same linear length. The term "overall length" as used herein refers to the length as measured from end to end of the anti-condensation drip element, whereas the term "linear length" as used herein refers to the length as measured along the longest path along the anti-condensation drop element. For example, where the anti-condensation drip element has a zigzag shape, the overall length is the length as measured as a direct line that connects the start of the zigzag with the end of the zigzag, while the linear length of the zigzag element is the length as measured as a line that follows the zigzag path of the element from one end to the other end.

Figure 2A:
FIG. 2A is one exemplary spike with a first anti-condensation drip element.
Figure 2B:
FIG. 2B is another exemplary spike with a second anti-condensation drip element.

Particularly contemplated anti-condensation drip element are formed in a spiral shape, a zigzag shape, a wave shape, and/or an irregular shape, each of which may further be serrated or include other structures that discourage condensation run-off. Thus, and viewed from another perspective, preferred anti-condensation drip elements will have an average weight to surface ratio that is substantially identical (no more than 10% deviation, and more typically no more than 5% deviation) with the weight to surface ratio of the spike. Exemplary configurations of suitable anti-condensation drip elements are depicted in FIGS. 2A and 2B. Preferably, the terminus of the anti-condensation drip element is non-injurious. That is, the terminus is curved such that accidental contact will not break the skin if the terminus is forced onto the skin. For example, suitable termini will be in shape of a loop such that the end of the spike is obstructed by the loop, or the end of the spike is covered with a small bead of a polymer. Therefore, at least some of contemplated deterring devices will have at least eight spikes, wherein each of the spikes most preferably includes an anti-condensation drip element that is formed in a spiral shape, a zigzag shape, a wave shape, and/or an irregular shape.

Thus, specific embodiments and applications of bird deflectors with blunt ended spikes have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Furthermore, where a definition or use of a term in a reference, which is incorporated by reference herein is inconsistent or contrary to the definition of that term provided herein, the definition of that term provided herein applies and the definition of that term in the reference does not apply.

The invention claimed is:

1. An bird deterring device, comprising:
a base coupled to a stem, and a plurality of radially arranged and outwardly extending spikes coupled to the stem;
wherein at least a portion of at least one of the plurality of radially arranged spikes has an upward orientation relative to the at least one of the base and stem;
wherein at least another one of the radially arranged spikes has a distal end with an anti-condensation drip element; and
wherein the anti-condensation drip element is formed in a shape selected from the group consisting of a spiral shape, a zigzag shape, a wave shape, and an irregular shape.

2. The device of claim 1 wherein the base and the stem are in a non-rotatable relationship relative to each other.

3. The device of claim 2 wherein the base and the stem are contiguous.

4. The device of claim 1 wherein the plurality of radially arranged and outwardly extending spikes are in a fixed relationship relative to a structure to which the base in coupled.

5. The device of claim 1 wherein the at least one of the plurality of radially arranged spikes has an arced configuration.

6. The device of claim 1 wherein the anti-condensation drip element is fabricated from the same material as the at least another one of the radially arranged spikes.

7. The device of claim 6 wherein the anti-condensation drip element is formed from the at least another one of the radially arranged spikes.

8. The device of claim 1 having at least eight spikes.

9. The device of claim 1 wherein the base and at least one of the stem and the plurality of spikes are in a rotatable relationship relative to each other.

10. The device of claim 1 wherein the base and the stem are fabricated from a synthetic polymer.

11. The device of claim 1 wherein the plurality of spikes are manufactured from a metal.

12. The device of claim 1 wherein the stem has an upper end having a size that allows a sparrow-sized bird to perch and that prevents a crow-sized bird to perch.

* * * * *